(12) United States Patent
Oota et al.

(10) Patent No.: US 11,378,937 B2
(45) Date of Patent: Jul. 5, 2022

(54) NUMERICAL CONTROLLER FOR CONTROLLING ACCELERATION AND DECELERATION OF SPINDLE FEED RATE

(71) Applicant: Fanuc Corporation, Yamanashi (JP)

(72) Inventors: Yuu Oota, Yamanashi (JP); Masaru Kuroiwa, Yamanashi (JP)

(73) Assignee: Fanuc Corporation, Yamanshi (JP)

( * ) Notice: Subject to any disclaimer, the term of this patent is extended or adjusted under 35 U.S.C. 154(b) by 342 days.

(21) Appl. No.: 16/674,192

(22) Filed: Nov. 5, 2019

(65) Prior Publication Data

US 2020/0159190 A1 May 21, 2020

(30) Foreign Application Priority Data

Nov. 15, 2018 (JP) .............................. JP2018-214353

(51) Int. Cl.
*G05B 19/416* (2006.01)
*G05B 19/4155* (2006.01)

(52) U.S. Cl.
CPC ....... *G05B 19/416* (2013.01); *G05B 19/4155* (2013.01); *G05B 2219/42173* (2013.01); *G05B 2219/45129* (2013.01); *G05B 2219/49108* (2013.01)

(58) Field of Classification Search
CPC .............. G05B 19/416; G05B 19/4155; G05B 2219/42173; G05B 2219/45129; G05B 2219/49108; G05B 2219/49086; G05B 19/4163; B23Q 15/013; B23Q 15/08
See application file for complete search history.

(56) References Cited

U.S. PATENT DOCUMENTS

| 6,257,348 B1* | 7/2001 | Momochi .......... G05B 19/4166 173/1 |
| 2005/0226692 A1 | 10/2005 | Makiyama et al. |
| 2011/0020084 A1* | 1/2011 | Brett .................... B23Q 15/013 408/1 R |
| 2013/0189043 A1* | 7/2013 | Uchiuzo ............ G05B 19/4163 408/1 R |
| 2014/0379115 A1* | 12/2014 | Koyanaka .......... G05B 19/4166 700/159 |

FOREIGN PATENT DOCUMENTS

| JP | 5336585 U | 3/1978 | |
| JP | 2004-001120 A | 1/2004 | |
| JP | 2005238415 A * | 9/2005 | ............. B23B 35/00 |
| JP | 2005238415 A | 9/2005 | |
| JP | 2012016793 A | 1/2012 | |

OTHER PUBLICATIONS

Japanese Notice of Reasons for Refusal for Japanese Application No. 2018-214353, dated Mar. 16, 2021, with translation, 7 pages.

* cited by examiner

*Primary Examiner* — Kenneth M Lo
*Assistant Examiner* — Jonathan Michael Skrzycki
(74) *Attorney, Agent, or Firm* — RatnerPrestia

(57) ABSTRACT

A numerical controller decelerates a spindle feed rate in a bite portion to a bite velocity lower than a commanded feed rate when drilling is carried out and then, after passage through a velocity recovery point where a measured spindle load is made substantially constant, accelerates the spindle feed rate from the bite velocity to the commanded feed rate.

8 Claims, 9 Drawing Sheets

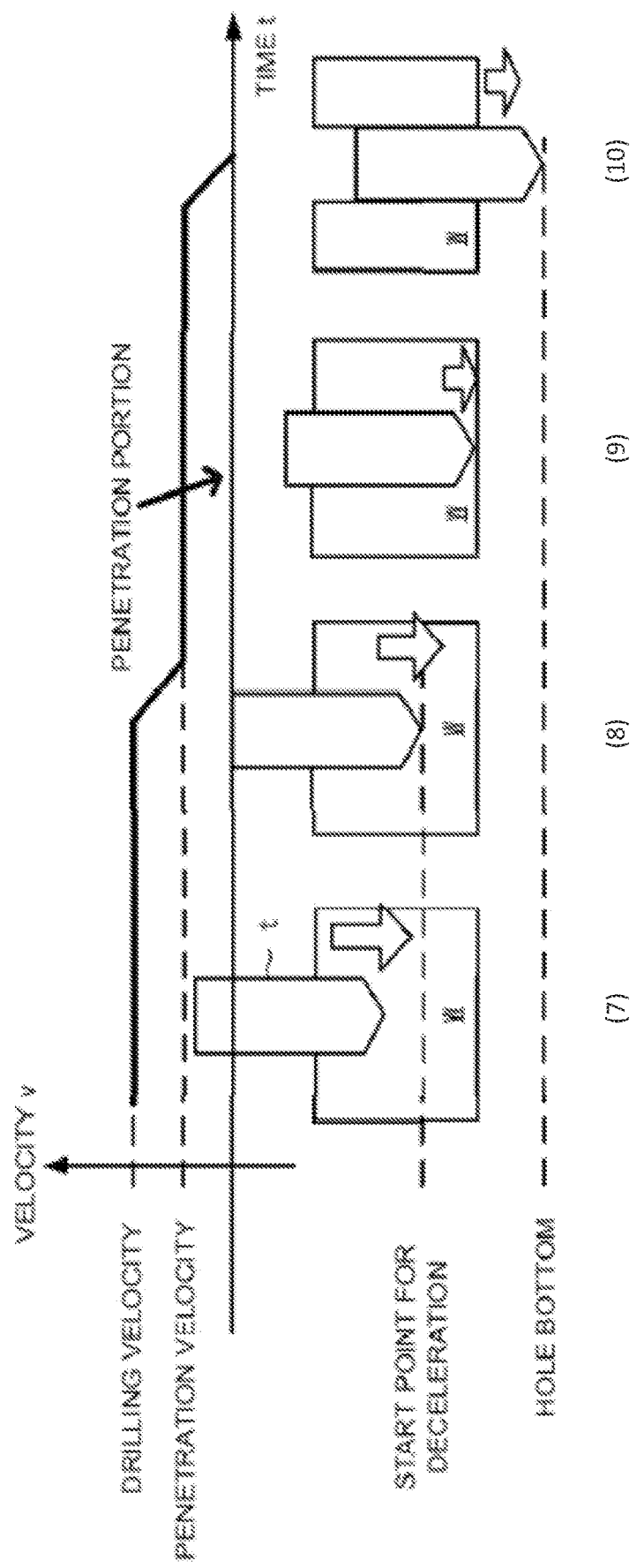

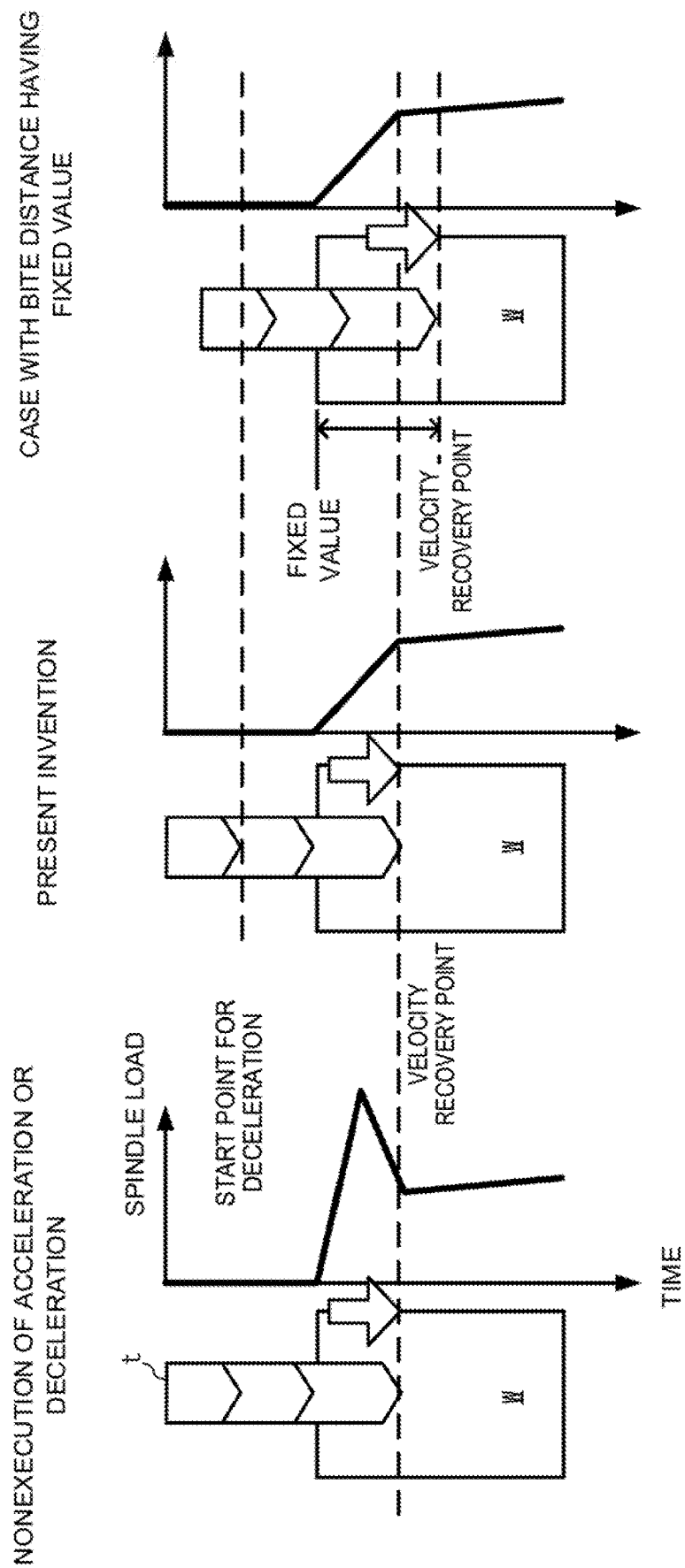

NUMERICAL CONTROLLER FOR CONTROLLING ACCELERATION AND DECELERATION OF SPINDLE FEED RATE

RELATED APPLICATIONS

The present application claims priority to Japanese Patent Application Number 2018-214353 filed Nov. 15, 2018, the disclosure of which is hereby incorporated by reference herein in its entirety.

BACKGROUND OF THE INVENTION

1. Field of the Invention

The present invention relates to a numerical controller and particularly relates to a numerical controller that carries out drilling at an optimal velocity while reducing tool load.

2. Description of the Related Art

FIG. 1 is a diagram illustrating a common drilling technique.

A numerical controller carries out a rapid traverse of a spindle (tool t) to a point R (FIG. 1, (a)) and makes the spindle travel at a feed rate for cutting feed until the tool t reaches a hole bottom of a workpiece W from the point R (FIG. 1, (b) to (d)). In this technique, the feed rate is constant from a moment of contact of the tool t with the workpiece W (FIG. 1, (b), bite portion) to drilling operation after the contact (FIG. 1, (c)). In case of a through-hole, the feed rate is constant at a moment of opening of the hole (FIG. 1, (d), penetration portion) as well.

When drilling is carried out with use of such a technique, there is a fear that tool fracture may occur upon the contact of the tool t with the workpiece W in the bite portion (FIG. 1, (b)) as illustrated in FIG. 2 (FIG. 2, (h)). In addition, there is a fear that a position of the hole may be deviated (accuracy may deteriorate) (FIG. 2, (i)). There is a fear that the tool fracture may occur in the penetration portion (FIG. 1, (d)) as well (FIG. 2, (j)). In addition, burrs may be made prone to occur (FIG. 2, (k)).

On condition that the feed rate for the cutting feed is decreased in order to settle those problems, another problem occurs in that cycle time may be prolonged because of decrease in the feed rate for the drilling operation (FIG. 1, (c)) for which the velocity does not need to be decreased.

Japanese Patent Application Laid-Open No. 2004-1120, an example of a prior art technique dealing with such problems, discloses setting the feed rate in a biting step (corresponding to the bite portion described above (FIG. 1, (b))) at a comparatively low velocity, executing machining at such low velocity by a predetermined bite distance, and then transitioning to cutting process to be carried out at a comparatively high feed rate (corresponding to the drilling operation described above (FIG. 1, (c))). Thus increase in load torque due to friction, thermal dissipation, or the like at time of the biting may be inhibited.

In the technique disclosed in Japanese Patent Application Laid-Open No. 2004-1120, however, a distance (bite distance) of continuous travel at the low feed rate after the biting step has a fixed value. The fixed value does not necessarily mean an optimal value from a viewpoint of reduction in occurrence of such various problems as described above and inhibition of unnecessary increase in the cycle time. Finding of the optimal value by trial and error would be extremely troublesome operation.

SUMMARY OF THE INVENTION

The present invention has been produced in order to settle such problems. An object of the invention is to provide a numerical controller that carries out drilling at an optimal velocity while reducing tool load.

A first aspect of a numerical controller according to the invention includes an acceleration/deceleration start position calculation unit that decelerates a spindle feed rate in a bite portion to a bite velocity lower than a commanded feed rate when drilling is carried out and a spindle load measurement unit that measures a spindle load. The acceleration/deceleration start position calculation unit is configured to accelerate the spindle feed rate from the bite velocity to the commanded feed rate, after passage through a velocity recovery point where the spindle load is made substantially constant.

The acceleration/deceleration start position calculation unit may identify a position where the spindle load is increased, as the bite portion, in prior machining.

The acceleration/deceleration start position calculation unit may identify the bite portion based on a setting value or a command from a machining program.

A second aspect of a numerical controller according to the invention includes the acceleration/deceleration start position calculation unit that decelerates the spindle feed rate in the bite portion to the bite velocity lower than the commanded feed rate when drilling of a through-hole is carried out. The acceleration/deceleration start position calculation unit is configured to accelerate, after passage through a specified velocity recovery point behind the bite portion, the spindle feed rate from the bite velocity to the commanded feed rate, and thereafter decelerate the spindle feed rate in a penetration portion to a penetration velocity lower than the commanded feed rate.

The numerical controller may further include a spindle load measurement unit that measures a spindle load and the acceleration/deceleration start position calculation unit may identify a position where the spindle load is increased, as the bite portion, in the prior machining.

The numerical controller may further include the spindle load measurement unit that measures the spindle load and the acceleration/deceleration start position calculation unit may identify a position where the spindle load is decreased, as the penetration portion, in the prior machining.

The acceleration/deceleration start position calculation unit may identify the bite portion or the penetration portion based on a setting value or a command from the machining program.

According to the present invention, it is possible to provide a numerical controller that carries out the drilling at an optimal velocity while reducing tool load.

BRIEF DESCRIPTION OF THE DRAWINGS

FIG. 8 is a diagram illustrating operation of the numerical controller in a penetration portion.

FIG. 9 is a diagram illustrating technical effects of the present invention.

DETAILED DESCRIPTION OF THE PREFERRED EMBODIMENT

Figure 1:
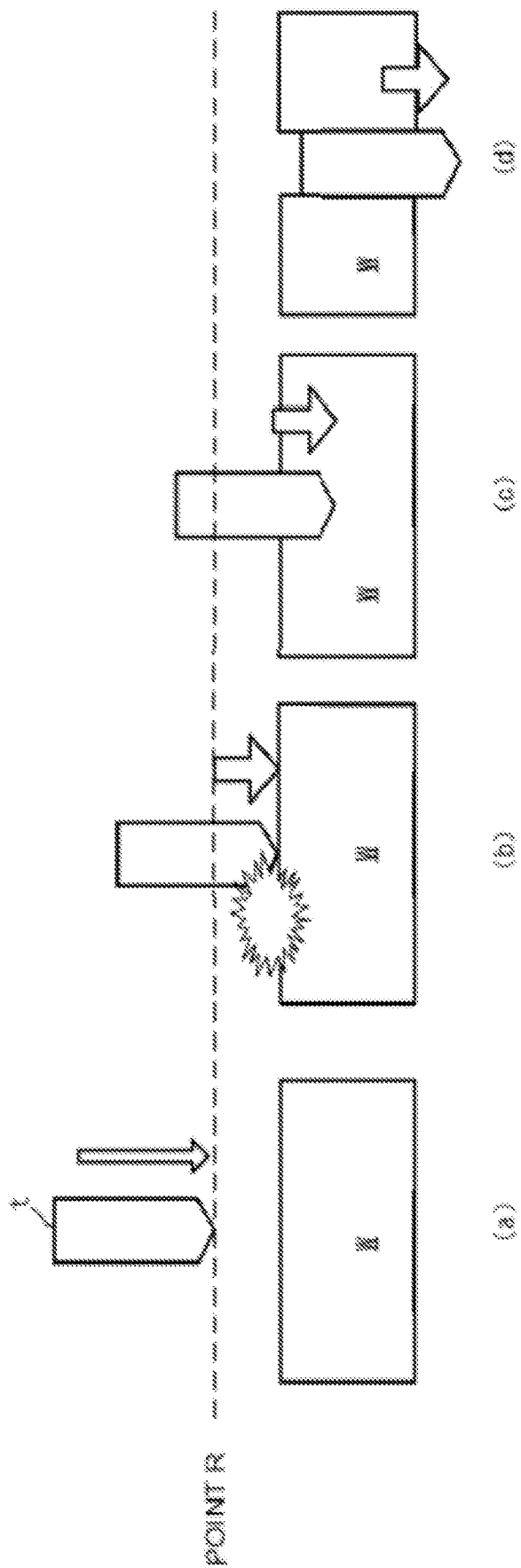
FIG. 1 is a diagram illustrating a problem in conventional drilling.
Figure 2:
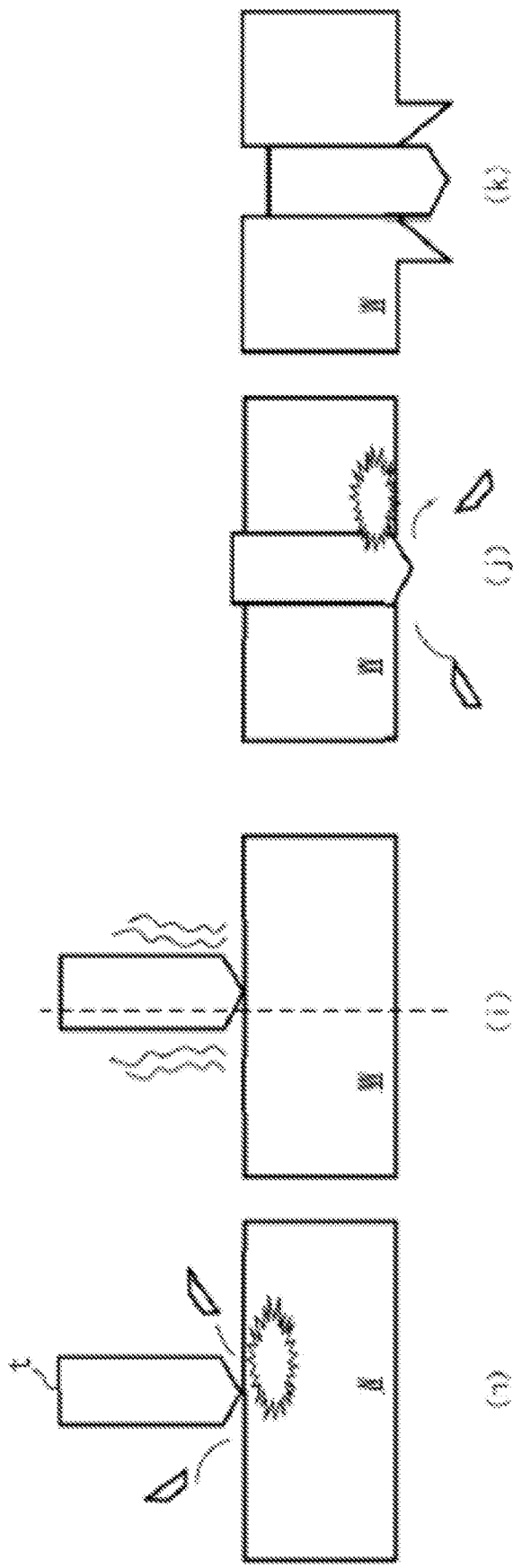
FIG. 2 is a diagram illustrating problems in the conventional drilling.
Figure 3:
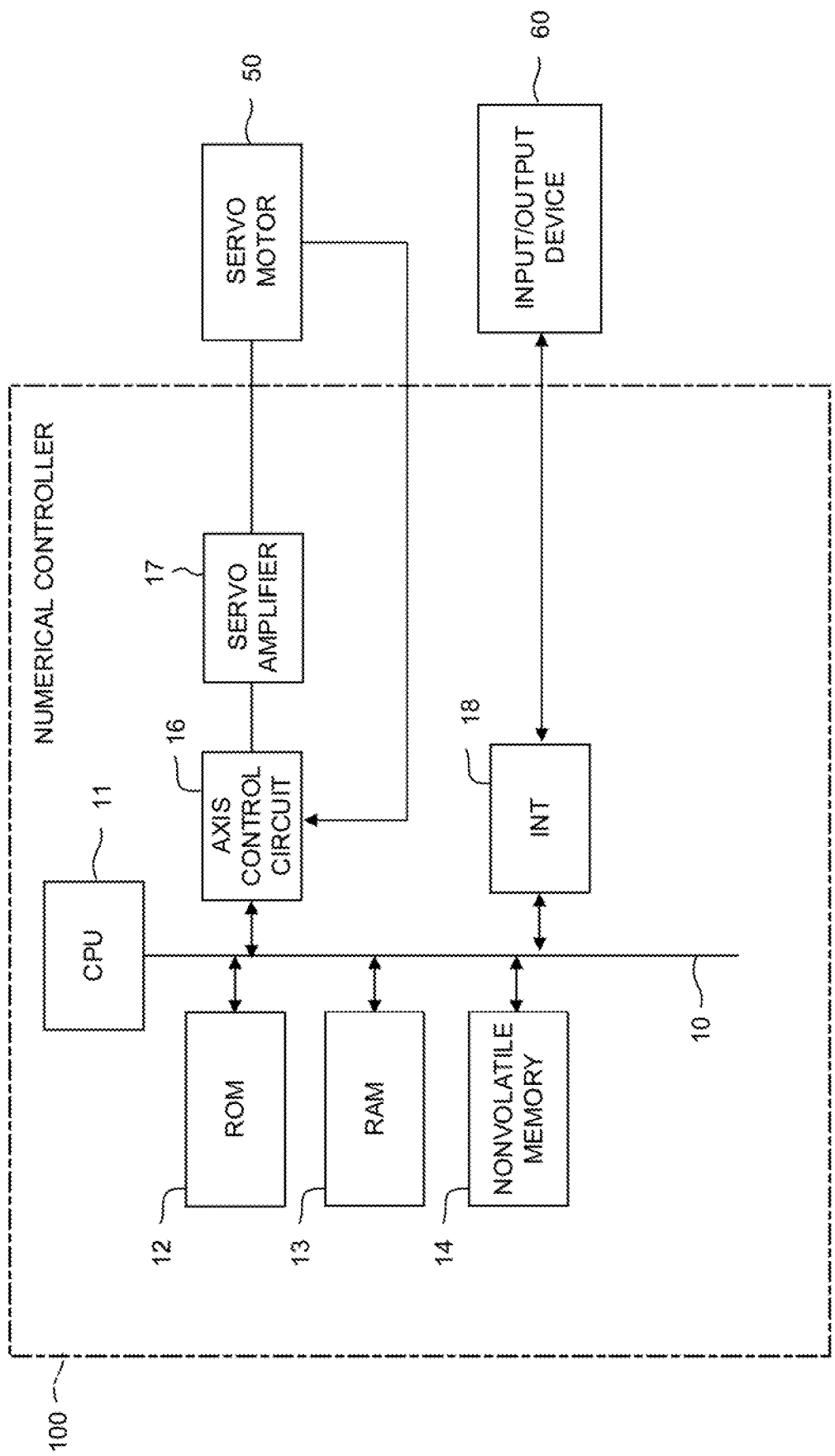
FIG. 3 is a diagram illustrating a hardware configuration of a numerical controller.

FIG. 3 is a schematic hardware configuration diagram illustrating major parts of a numerical controller 100 according to an embodiment.

The numerical controller 100 is a device that controls an industrial machine to carry out drilling. The numerical controller 100 includes a CPU 11, a ROM 12, a RAM 13, a nonvolatile memory 14, a bus 10, axis control circuits 16, servo amplifiers 17, and an interface 18. Servo motors 50 and an input/output device 60 are connected to the numerical controller 100.

The CPU 11 is a processor that generally controls the numerical controller 100. The CPU 11 reads out system programs stored in the ROM 12 via the bus 10 and controls the whole numerical controller 100 in accordance with the system programs.

The ROM 12 has stored the system programs for execution of various types of control over the machine in advance, for instance. The RAM 13 temporarily stores temporary calculation data, display data, or various kinds of data, programs, or the like inputted by an operator through the input/output device 60.

The nonvolatile memory 14 is backed up by a battery (not shown), for instance, so that storage status of the nonvolatile memory 14 is retained even if the numerical controller 100 is powered off. The nonvolatile memory 14 stores data, programs, or the like that is inputted through the input/output device 60. The programs, the data, or the like that is stored in the nonvolatile memory 14 may be expanded in the RAM 13 for execution and use.

The axis control circuits 16 control motion axes of the machine. The axis control circuits 16 receive movement command amounts for the axes outputted by the CPU 11 and output movement commands for the motion axes to the servo amplifiers 17. The servo amplifiers 17 receive the movement commands for the axes outputted by the axis control circuits 16 and drive the servo motors 50.

The servo motors 50 are driven by the servo amplifiers 17 and make the motion axes of the machine to move. In the embodiment, movement of the spindle is caused by the servo motors 50. The servo motors 50 typically incorporate position/velocity detectors. The position/velocity detectors output position/velocity feedback signals, so that feedback control over positions and velocities is carried out through feedback of the signals to the axis control circuits 16.

Though the axis control circuits 16, the servo amplifiers 17, and the servo motors 50 are each illustrated as only one element in FIG. 3, numbers of the axis control circuits 16, the servo amplifiers 17, and the servo motors 50 that are actually provided are equal to a number of the axes included in the machine to be controlled.

The input/output device 60 is a data input/output device including a display, hardware keys, or the like and is an manual data input device (MDI) or an operation panel, typically. The input/output device 60 displays information, received from the CPU 11 through the interface 18, on the display. The input/output device 60 passes commands, data, or the like, inputted through the hardware keys or the like, to the CPU 11 through the interface 18.

Figure 4:
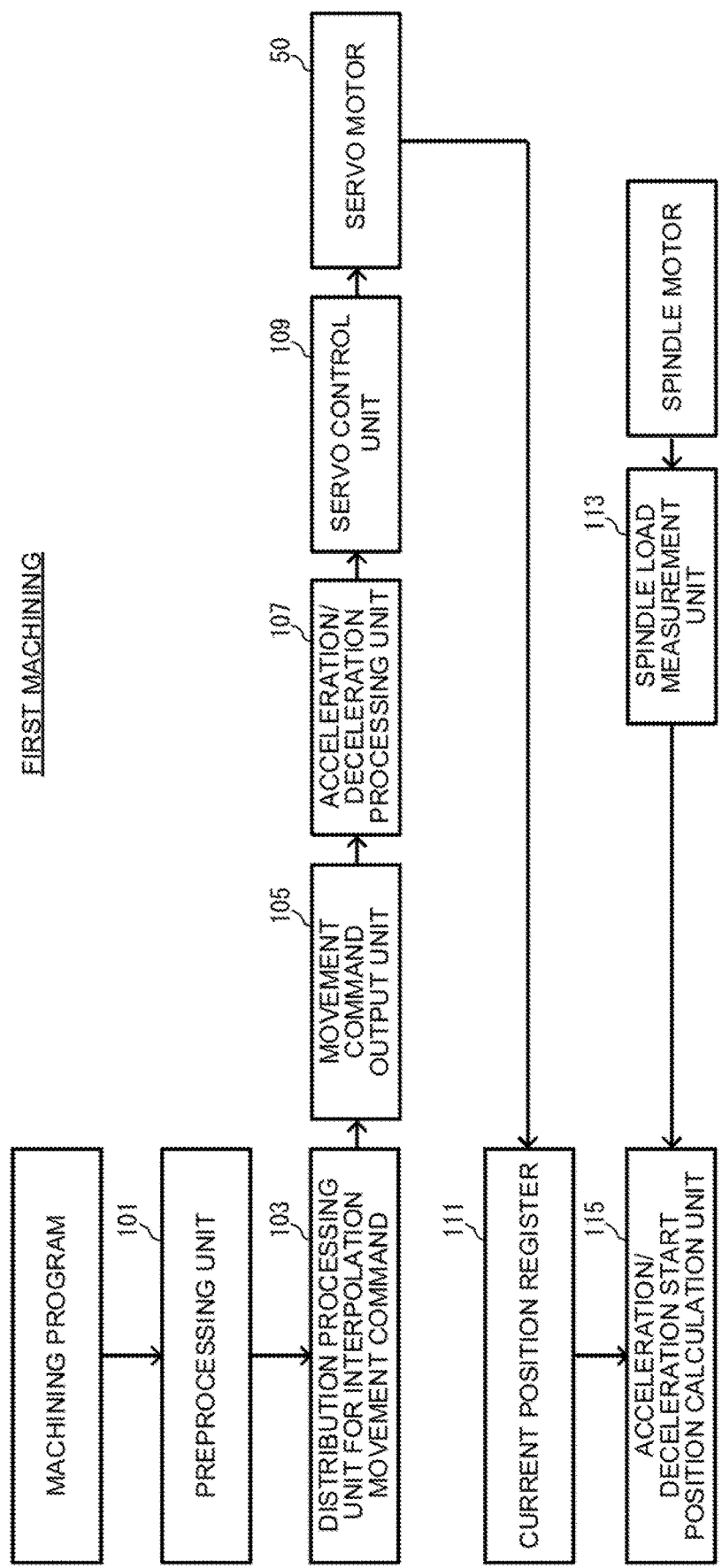
FIG. 4 is a diagram illustrating a functional configuration of the numerical controller.
Figure 5:
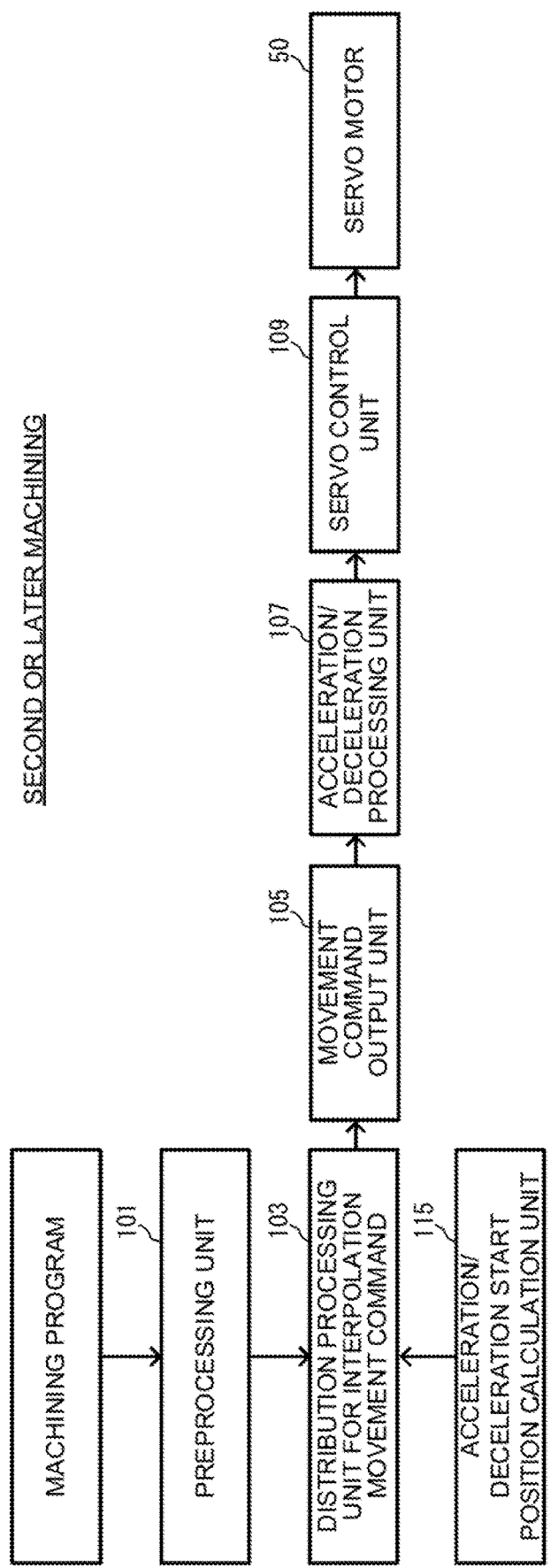
FIG. 5 is a diagram illustrating a functional configuration of the numerical controller.

FIGS. 4 and 5 are block diagrams illustrating characteristic functional configurations of the numerical controller 100. FIG. 4 represents functional blocks in a first machining for identification of the bite portion and the penetration portion and FIG. 5 represents functional blocks in second or later machining.

The numerical controller 100 includes a preprocessing unit 101 that reads out and analyzes a machining program, a distribution processing unit 103 for interpolation movement command that generates interpolation movement commands and that distributes the interpolation movement commands among the axes, a movement command output unit 105 that outputs the movement commands to the axes, an acceleration/deceleration processing unit 107 that carries out acceleration or deceleration subsequent to interpolation, and a servo control unit 109 that controls the servo motors 50. The numerical controller 100 further includes a current position register 111 that retains a current position of the spindle, a spindle load measurement unit 113 that calculates a load torque by always detecting load current in a spindle motor, and an acceleration/deceleration start position calculation unit 115 that calculates start positions for acceleration or deceleration for reduction in the tool load, as components that are unique to the present invention.

Figure 6:
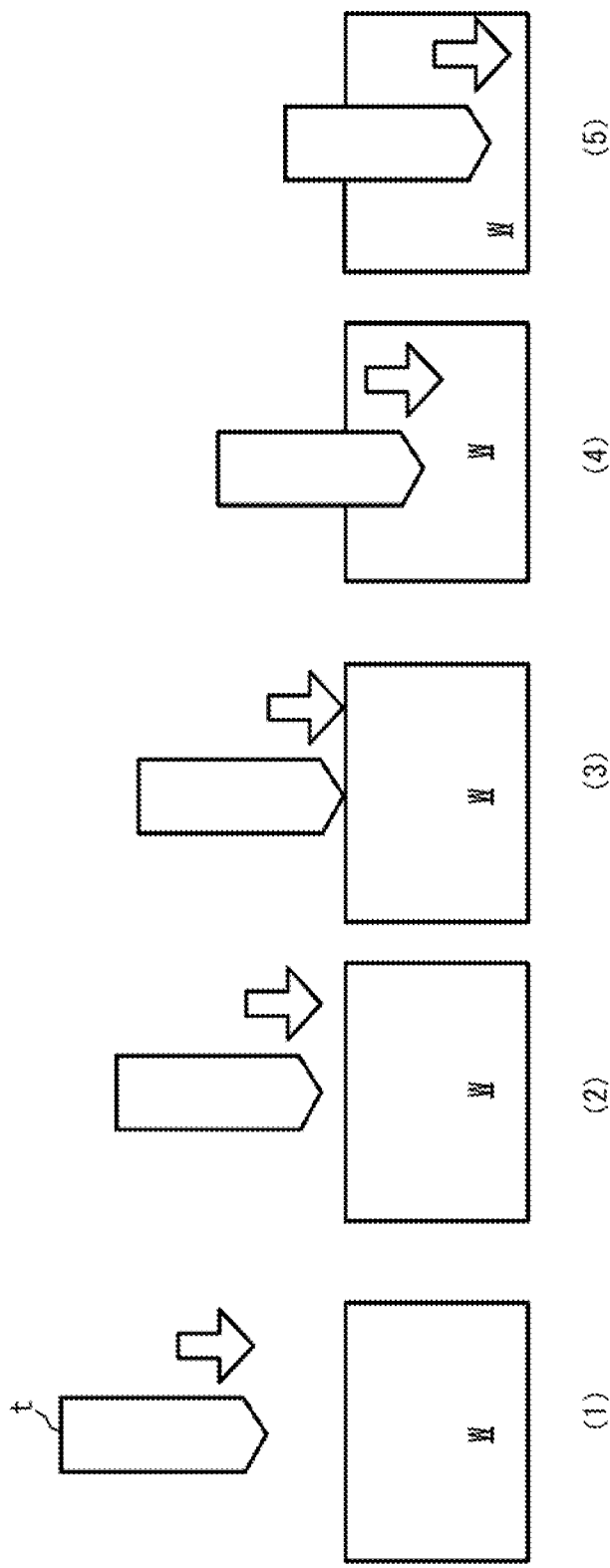
FIG. 6 is a diagram illustrating an outline of operation of the numerical controller.

An outline of operation of the numerical controller 100 according to the embodiment will be described by referring to FIG. 6.

The numerical controller 100 makes the spindle travel at the commanded feed rate until the tool t for machining the workpiece W reaches a start point for deceleration in front of the bite portion (1), starts deceleration at the start point for deceleration (2), makes the feed rate comparatively low in the bite portion (3), carries out machining with the feed rate maintained, until the spindle load is stabilized after biting (4), and recovers the commanded feed rate when the spindle load is stabilized (5).

In case of a through-hole, the numerical controller 100 further makes the spindle travel at the commanded feed rate until the tool t reaches a start point for deceleration in front of the penetration portion and starts the deceleration at the start point for deceleration, so that the feed rate is made comparatively low in the penetration portion.

Figure 7:
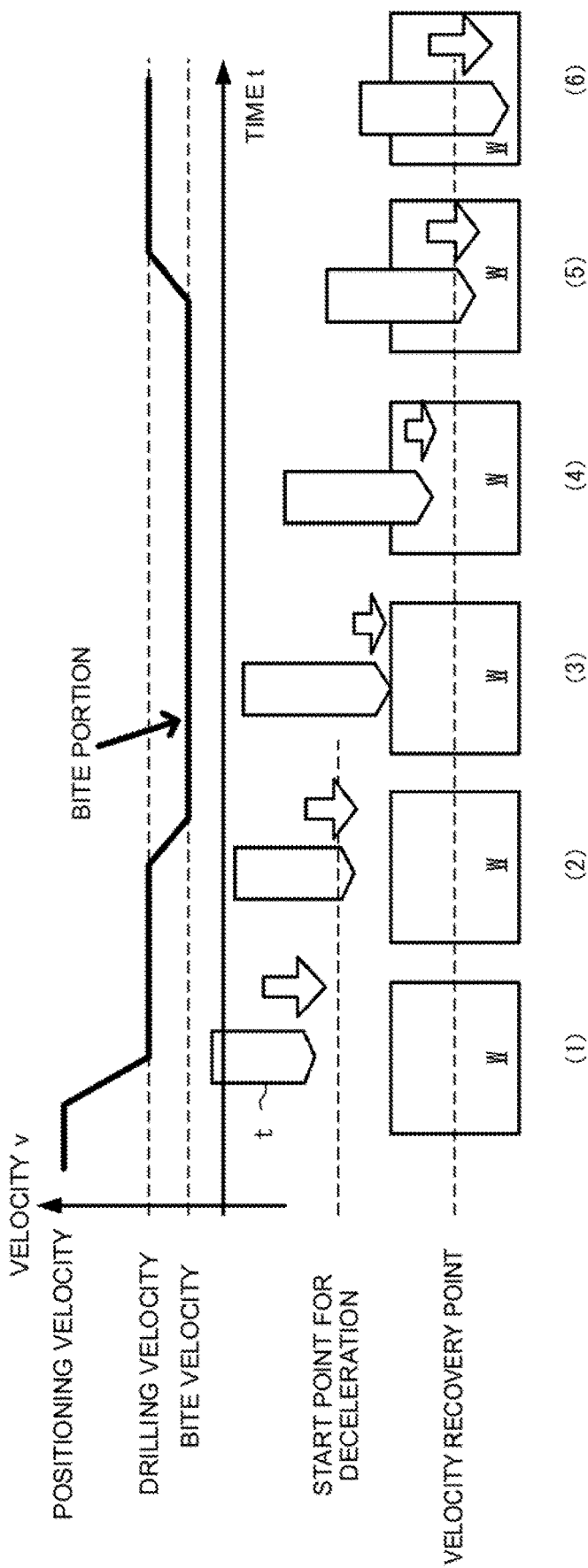
FIG. 7 is a diagram illustrating operation of the numerical controller in a bite portion.

Operations of processing units in the bite portion will be specifically described by referring to FIG. 7.

<First Machining>

The first machining is a preparation stage for identification of the start positions for acceleration or deceleration. The numerical controller 100 carries out usual machining in accordance with the commanded feed rate. During the machining, current positions of the servo motors 50 are registered in the current position register 111 and are sequentially updated. The spindle load measurement unit 113 always monitors the spindle load and, upon detection of increase in the load, notifies the acceleration/deceleration start position calculation unit 115 thereof. The acceleration/deceleration start position calculation unit 115 refers to the current position register 111 and stores the current positions of the servo motors 50 at this point of time, as the bite portion. The spindle load measurement unit 113 detects a position where the load is stabilized after passage through the bite portion and notifies the acceleration/deceleration start position calculation unit 115 of the detected position.

The acceleration/deceleration start position calculation unit 115 refers to the current position register 111 and stores the current positions of the servo motors 50 at this point of time, as a velocity recovery point.

The spindle load measurement unit 113 may determine the increase in the load when the spindle load exceeds a threshold that has been set in advance or that has been commanded by a program (or a default value in case where such a threshold has not been set or specified). The stabilization in the load may be determined if the spindle load falls within a variability rate that has been set in advance or commanded in a program (or a default value in case where the variability rate has not been set or specified).

<Second or Later Machining>

In the second or later machining, the acceleration or deceleration for the reduction in the tool load is carried out. The distribution processing unit 103 for interpolation movement command makes the spindle travel at the commanded feed rate until the tool t reaches the start point for deceleration in front of the bite portion (1).

The acceleration/deceleration start position calculation unit 115 decelerates travelling velocity of the spindle after passage through the start point for deceleration so that the travelling velocity of the spindle may reach a specified bite velocity before arrival at the bite portion (2). The bite velocity may be registered as a setting value in advance or may be commanded in the machining program. The start point for deceleration is calculated based on a predetermined acceleration, a position of the bite portion, and the bite velocity. Alternatively, the point R commanded in the machining program may be set as the start point for deceleration. In this case, acceleration to the bite velocity, not to the commanded feed rate, is carried out after travel of the tool t is started from the point R (commanded feed rate>bite velocity). The acceleration/deceleration start position calculation unit 115 carries out the machining at the bite velocity that is a constant velocity after the passage through the bite portion (3) and (4).

Upon arrival of the tool t at the velocity recovery point, the acceleration/deceleration start position calculation unit 115 starts to accelerate the feed rate of the spindle and recovers the commanded feed rate (5). Though the velocity recovery point calculated in the first machining is used in the embodiment, the acceleration/deceleration start position calculation unit 115 may calculate the velocity recovery point in real time in the second or later machining and may then start the acceleration. The machining is carried out at the constant velocity after the commanded feed rate is recovered (6).

Operation of each of the processing units in the penetration portion in machining of a through-hole in the workpiece W with the use of the tool t will be specifically described by referring to FIG. 8.

<First Machining>

The first machining is the preparation stage for the identification of the start positions for acceleration or deceleration. The numerical controller 100 carries out usual machining in accordance with the commanded feed rate. During the machining, the current positions of the servo motors 50 are registered in the current position register 111 and are sequentially updated. The spindle load measurement unit 113 always monitors the spindle load and, upon detection of decrease in the load, notifies the acceleration/deceleration start position calculation unit 115 thereof. The acceleration/deceleration start position calculation unit 115 refers to the current position register 111 and stores the current positions of the servo motors 50 at this point of time, as the penetration portion.

The spindle load measurement unit 113 may determine the decrease in the load when the spindle load falls below a threshold that has been set in advance or that has been commanded by a program (or a default value in case where such a threshold has not been set or specified).

<Second or Later Machining>

In the Second or later machining, the acceleration or deceleration for the reduction in the tool load is carried out. The distribution processing unit 103 for interpolation movement command makes the spindle travel at the commanded feed rate until the tool t reaches the start point for deceleration in front of the penetration portion (7).

The acceleration/deceleration start position calculation unit 115 decelerates the feed rate of the spindle after the passage through the start point for deceleration so that the travelling velocity of the spindle may reach a specified penetration velocity before the tool t arrives at the penetration portion (8). The penetration velocity may be registered as a setting value in advance or may be commanded in the machining program. The start point for deceleration is calculated based on the predetermined acceleration, a position of the penetration portion, and the penetration velocity. The start point for deceleration may be calculated through a calculation based on a specified clearance, in form of "hole bottom position +clearance Q" or the like. The acceleration/deceleration start position calculation unit 115 continues travel to the hole bottom at the penetration velocity after the passage through the penetration portion (9) and (10).

According to the embodiment, tool fracture or the like in the drilling may be prevented because of the deceleration from the commanded feed rate in the bite portion or the penetration portion. In the embodiment of the present invention, as illustrated in FIG. 9, sharp increase in the spindle load after the passage through the bite portion is inhibited in comparison with a case where acceleration or deceleration is not carried out. In addition, machining accuracy may be increased because the deceleration in the bite portion prevents deviation in the position during the drilling. The deceleration in the penetration portion may inhibit occurrence of burrs.

According to the embodiment, a period of time during which the velocity is decreased may be shortened by start of the deceleration at the start point for deceleration derived from the position of the bite portion or the penetration portion and by cancellation of the deceleration at the velocity recovery point where the spindle load is stabilized, so that influence on cycle time may be kept to minimum necessary.

According to the embodiment of the invention, as illustrated in FIG. 9, particularly, as compared with the prior art technique in which the distance (bite distance) of the travel of the tool t at the bite velocity is the fixed value, the bite distance can be kept to minimum necessary because the bite distance is set so as to include a site where the spindle load is stabilized and thus increase in the cycle time can be minimized. Otherwise, expiration of the bite distance before the stabilization in the spindle load can be prevented.

The invention is not limited to the embodiment described above and may be modified appropriately within a scope not departing from purport of the present invention. In the embodiment described above, for instance, the bite portion or the penetration portion is determined based on variation in the spindle load in a first drilling. On condition that a drilling position (height of the workpiece W) has been known in advance or on condition that the point R has been commanded, however, the drilling position or the point R may be determined as the bite portion. On condition that a thickness of the workpiece W has been known in advance, the penetration portion may be determined by the calculation of subtracting the thickness of the workpiece from the drilling position. The height or the thickness of the workpiece W may be specified as a setting value or in the machining program or may be calculated through measurement with use of a camera, a sensor, or the like. Thus the bite portion or the penetration portion may be determined without observation of the spindle load and therefore the first machining mentioned in relation to the embodiment described above may be omitted so that acceleration/deceleration processing may be applied from first time.

The invention claimed is:

1. A numerical controller comprising:
an acceleration/deceleration start position calculation unit that, in response to the numerical controller determining that a drill bit is approaching a predetermined bite portion of a workpiece, decelerates a spindle feed rate to a bite velocity lower than a commanded feed rate when drilling is carried out, and maintains the bite velocity throughout drilling of the predetermined bite portion; and
a spindle load measurement unit that measures a spindle load, wherein
the acceleration/deceleration start position calculation unit is further configured to accelerate the spindle feed rate from the bite velocity to the commanded feed rate in response to the numerical controller determining that the drill bit has exited the predetermined bite portion of the workpiece after passage through a velocity recovery point, the determination that the drill bit has exited the predetermined bite portion of the workpiece being made when the measured spindle load is determined to be constant.

2. The numerical controller according to claim 1, wherein the acceleration/deceleration start position calculation unit identifies a position where the spindle load is increased as the predetermined bite portion in prior machining.

3. The numerical controller according to claim 1, wherein the acceleration/deceleration start position calculation unit identifies the predetermined bite portion based on a setting value or a command from a machining program.

4. The numerical controller according to claim 1, wherein the acceleration/deceleration start position calculation unit is further configured to decelerate the spindle feed rate to a penetration velocity lower than the commanded feed rate in response to the numerical controller determining that the drill bit is approaching a penetration portion of the workpiece.

5. A method for controlling a spindle feed rate comprising:
in response to a numerical controller determining that a drill bit is approaching a predetermined bite portion of a workpiece, decelerating, by an acceleration/deceleration start position calculation unit, the spindle feed rate to a bite velocity lower than a commanded feed rate when drilling is carried out, and maintaining the bite velocity throughout drilling of the predetermined bite portion;
measuring, by a spindle load measurement unit, a spindle load; and accelerating, by the acceleration/deceleration start position calculation unit, the spindle feed rate from the bite velocity to the commanded feed rate in response to the numerical controller determining that the drill bit has exited the predetermined bite portion of the workpiece after passage through a velocity recovery point, the determination that the drill bit has exited the predetermined bite portion of the workpiece being made when the measured spindle load is determined to be constant.

6. The method according to claim 5, further comprising:
identifying, by the acceleration/deceleration start position calculation unit, a position where the spindle load is increased as the predetermined bite portion in prior machining.

7. The method according to claim 5, further comprising:
identifying, by the acceleration/deceleration start position calculation unit, the predetermined bite portion based on a setting value or a command from a machining program.

8. The method according to claim 5, further comprising:
decelerating, by the acceleration/deceleration start position calculation unit, the spindle feed rate to a penetration velocity lower than the commanded feed rate in response to the numerical controller determining that the drill bit is approaching a penetration portion of the workpiece.

* * * * *